106. COMPOSITIONS, COATING OR PLASTIC.

76 Patented Mar. 1, 1938

2,109,661

UNITED STATES PATENT OFFICE 2,109,661

MANUFACTURE OF RUBBER COMPOSITIONS

George Parry Davis, Bondi Beach, near Sydney, Australia

No Drawing. Application July 13, 1936, Serial No. 90,384. In Australia July 13, 1935

7 Claims. (Cl. 106—23)

This invention relates to improvements in the manufacture of compositions which contain rubber, the invention being especially applicable to compositions utilizable in the construction of rubber surfaced roads, pavements, walls, roofs or the like, such compositions being also applicable for other purposes.

The primary object of the invention is to provide an improved composition containing rubber which, as compared with existing rubber compositions, will ensure a more extensive range of application; longer life in use, increased stability and the advantage of setting much more rapidly than hitherto. The composition when completed and in use is close textured, non-porous, durable, non-shrinking and of non-skid character. When the improved composition is applied to a road or the like, the surface thereof is ready for traffic in a relatively short period.

Another object of the invention is to provide an improved composition containing rubber whereby the improved composition may be applied as a surfacing composition to enable a continuous unbroken surface in manner similar to the laying of cement mortar or concrete, thus obviating or minimizing the lifting effect caused by moisture entering through the usual joints of the surfacing medium and gaining access to the under surface of the road where the customary rubber or wood blocks are used.

In accordance with the invention a wide variety of rubber emulsions can be utilized such, for instance, as vulcanized latex emulsions, or rubber latex emulsion, and emulsions made from rubber solutions (whether vulcanized or unvulcanized). Vulcanized latex emulsion may be made from unvulcanized latex by adding to each pint of unvulcanized latex approximately 1.2 ozs. each of colloidal sulphur and zinc oxide; this will give a natural straight emulsion. An artificial straight emulsion may be made from a reversed emulsion such as vulcanized or unvulcanized rubber solution by incorporating together a rubber solution, an emulsifying agent, and water (preferably hot water). Such artificial straight emulsion may be made as follows:—

Rubber solution (reversed emulsion)

gallons__ 2
Soap or other emulsifying agent_____pound__ ½
Water (preferably hot)_____gallon__ ½

This emulsion is stable and it is also dilutable in water.

To gel or set a wet slurry of any of the rubber emulsions above indicated are incorporated permanent water hardening reagents such as solutions of gypsum, (calcium sulphate) calcium chloride, alum, magnesium sulphate, magnesium chloride and the like or a mixture of these immediately prior to the composition being applied for use. These water hardening reagents may be present in sufficient quantity to ensure curdling of the wet rubber slurry. The said wet rubber slurry prior to the addition of water hardening solution thereto may consist of a rubber emulsion having water softening menstruum or agent which serves as a dispersoid or protective colloid, and it may be water-glass solution, or freshly dissolved caustic soda solution, and/or alkaline protalbinate solution in the form of keratinous hydrosol. The resultant wet rubber slurry contains the desired percentage of dry rubber content of a rubber emulsion as hereinbefore mentioned together with fillers or other compounding ingredients in dry form such as accelerators, anti-oxidants, activators of accelerators, vulcanizing agents, softeners, antiseptics, colouring matter or the like to produce a rubber composition having the ability to coagulate and set with uniformity after being curdled or broken with water hardeners. In certain cases diatomaceous earth may be used as a shrinking or hygroscopic filler or finely ground coke or pumice as a non-shrinking or non-hygroscopic filler. Other suitable materials as fillers to those mentioned can be utilized, such as "black soils" or the like, the latter being especially applicable for use with vulcanized rubber emulsions.

The said wet mix prior to the addition of water hardening solution thereto if desired may be kept indefinitely in sealed containers in the form of a thin slurry or slime, wherein due to the action of the dispersing agent a slurry is formed which is in a highly colloidal state. The slurry can be thickened and slowly hardened for use if water hardening reagents as beforementioned be added thereto by stirring in quantity sufficient to break or curdle the slurry.

The curdled slurry gives a controlled and workable mortar which affords ample time to the plasterer to spread and work it as desired with his screed, or float or trowel.

In every case a small percentage of rubber content is always utilized with a high percentage of filler content, the hardening being effected by freeing the wet rubber slurry of its removable water by curdling of sludge by addition of water hardening reagent which reacts upon the colloidal slurry to form a curdled slime of irreversible gels which shed excess water and set hard and are permanently insoluble.

In applying the prepared rubber compositions above described to road or other surfaces the electrical charge of the wet rubber slurry is first changed by the addition thereto of the water hardening reagent whereby the water present in the slurry will be hardened and the slurry curdled or broken to enable it to start its set and be conditioned for trowelling and control in the laying thereof.

The alkaline protalbinate solution in the form of keratinous hydrosol referred to above is obtainable by macerating or digesting the keratinous material such as oak tanned leather waste with washing soda or caustic soda or potash or such as wool or feathers with washing soda or caustic soda or potash. Boiling facilitates and quickens the operation of obtaining the necessary extract or solution.

The following are given as examples of materials which can be utilized in the preparation of the said keratinous hydrosol.

1. Oak tanned powder leather waste

| | |
|---|---|
| Oak tanned powder leather waste pounds | 2½ |
| Washing soda or caustic soda or potash pound | ½ |
| Water gallons | 5 |

2. Low grade wool (crutchings or dage)

| | |
|---|---|
| Low grade wool (crutchings or dage) pounds | 2½ |
| Washing soda or caustic soda or potash pound | ½ |
| Water gallons | 5 |

As one typical example of a suitable composition in connection with the invention operable under control in which shrinking materials are utilized, the following is given:—

A dry mix is made consisting of—

| | Parts by weight |
|---|---|
| Kaolin | 13 |
| Diatomaceous earth | 13 |
| Portland cement | 28 |
| Yellow ochre (or other colour) | 12 | this is slimed by—

| | Parts by weight |
|---|---|
| Commercial sodium silicate (waterglass) | 6 |
| Water | 50 |

To such slime or slurry is added and incorporated by stirring—40 parts by weight rubber latex (60% commercial) or vulcanized rubber latex or rubber emulsion such containing not more than one quarter its bulk of keratinous hydrosol.

Said wet slurry is controlled for working by stirring into it—8 parts by weight of gypsum slimed with water. Any other suitable water hardening reagent may be utilized in suitable proportion sufficient to start curdling of the slurry.

As an example of a non-shrinking composition when the fillers utilized in the production of the composition are to comprise fillers of hydroscopic and of non-hydroscopic types this is as follows:—

Dry mix 3 parts by volume diatomaceous earth (hygroscopic and shrinking filler).

2 parts by volume of finely ground coke or pumice (non-hydroscopic and non-shrinking fillers).

(5 parts in total).

Slimed by:—

¾ volume alkaline protalbinate solution in the form of keratinous hydrosol diluted by 3¾ volume water.

To above slurry is added and incorporated by stirring the following:—

3 parts by volume rubber latex (60% commercial) or vulcanized rubber latex or rubber emulsion.

Subsequently to enable the above slurry to be used under control there is added to the slurry by stirring a quantity of alum solution sufficient to curdle the slurry.

In road or like surfacing operations with rubber compositions according to this invention it has been found that the natural solar heat effects slow vulcanization of the surfacing medium by reason of the presence of sulphur compound and accelerators present in such rubber compositions. To augment or expedite such solar vulcanization and to enable the composition to show resistance to deterioration thereof by sunlight such composition can have added thereto chlorophyll. To achieve such object approximately one tablespoon of chlorophyll solution (composed of linseed oil to which has been added sufficient chlorophyll to colour it a bright green) may be added to each gallon of rubber emulsion present in the composition.

In actual practice in the laying or construction of a road to be served or coated with rubber composition as herein described a firm but porous road bed or binder course of rolled road metal or other road foundation material can be flooded or coated with the water-hardened wet rubber slurry, the said slurry being poured between guide timbers to a depth which on shrinkage by drying and rolling will afford the required thickness of road coating or covering. Any desired crown or camber may be given to the road by known means during the application of the rubber surfacing material to the road. The road at bends thereof where strain is intensified may also be singly or doubly reinforced by expanded metal or steel mesh or rods or other preferred reinforcement.

The water freed by the water hardening step during the setting of the slurry is allowed to drain away from below, and/or evaporate from the surface until the coagulated or curdled slurry is of a firm texture and has permeated throughout and sufficiently firmly into the undercourse of the road or the like to permit it being freed from air voids, and compacted by rolling. After being carefully rolled it will be found that the road or like surface will rapidly set and become sufficiently dry and hard for traffic in a relatively short period.

If a firm undersurface of a road consisting of concrete, bitumen, wood, macadam or the like is to be covered with rubber composition as herein described it is necessary to first apply a suitable adhesive tack coating to the surface to be treated. The said superimposed rubber composition reacts to this adhesive tack coat forming a solid homogenous mass which is inseparable from the base to which it is applied.

Flooring of patchwork or other variegated colouring may also be obtained through the invention by utilizing the composition of materials herein described so as to have different coloured mixes and disposing small pieces of the compound material of various colours side by side on the foundation to be covered, and compacting them into one surface by tamping or heavy rolling.

It will be understood that although the invention as above described refers to permanent water hardening reagents in solution that the water hardening reagents described may be incorporated with the wet rubber slurry in dry form.

What I claim as my invention and desire to secure by Letters Patent is:—

1. A rubber emulsion capable of being coagulated by a water-hardening reagent, comprising a dispersion of rubber in an alkaline protalbinate solution in the form of a keratinous hydrosol, the proportion of hydrosol being less than that of the rubber.

2. A rubber emulsion capable of being coagulated by a water-hardening reagent, comprising a dispersion of rubber and filler material in an alkaline protalbinate solution in the form of a keratinous hydrosol, the proportion of filler being greater than that of the rubber and the proportion of hydrosol being less than that of the rubber.

3. A rubber emulsion capable of being coagulated by a water-hardening reagent, comprising a dispersion of rubber and filler material in an alkaline protalbinate solution in the form of a keratinous hydrosol, a part of the filler material consisting of black soil and the proportion of hydrosol being less than that of the rubber.

4. A rubber emulsion capable of being coagulated by a water-hardening reagent, comprising a dispersion of rubber in a solution of water glass and an alkaline protalbinate in the form of a keratinous hydrosol, the proportion of hydrosol being less than that of the rubber.

5. A rubber emulsion capable of being coagulated by a water-hardening reagent, comprising a dispersion of rubber in a solution of an alkaline protalbinate solution in the form of a keratinous hydrosol obtained by subjecting keratinous material to hydrolysis by means of caustic alkali, the proportion of hydrosol being less than that of the rubber.

6. A method of preparing hard, insoluble rubber compositions, comprising adding a water-hardening reagent to a dispersion of rubber in an alkaline protalbinate solution in the form of a keratinous hydrosol, and allowing the mixture to set, the proportion of hydrosol being less than that of the rubber.

7. A rubber emulsion capable of being coagulated by a water hardening reagent, comprising a dispersion of rubber in an alkaline protalbinate solution in the form of a keratinous hydrosol.

GEORGE PARRY DAVIS.